United States Patent
Zheng et al.

(10) Patent No.: US 8,291,167 B2
(45) Date of Patent: Oct. 16, 2012

(54) SYSTEM AND METHOD FOR WRITING CACHE DATA AND SYSTEM AND METHOD FOR READING CACHE DATA

(75) Inventors: Qin Zheng, Shenzhen (CN); Haiyan Luo, Shenzhen (CN); Hui Lu, Shenzhen (CN); Junliang Lin, Shenzhen (CN); Yunfeng Bian, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 92 days.

(21) Appl. No.: 12/877,977

(22) Filed: Sep. 8, 2010

(65) Prior Publication Data

US 2010/0332743 A1 Dec. 30, 2010

Related U.S. Application Data

(63) Continuation of application No. PCT/CN2009/070690, filed on Mar. 9, 2009.

(30) Foreign Application Priority Data

Mar. 10, 2008 (CN) .......................... 2008 1 0101662

(51) Int. Cl.
*G06F 12/00* (2006.01)
(52) U.S. Cl. ............. 711/118; 711/5; 711/105; 711/119
(58) Field of Classification Search .................... None
See application file for complete search history.

(56) References Cited

U.S. PATENT DOCUMENTS 6,347,344 B1 * 2/2002 Baker et al. .................. 710/20

FOREIGN PATENT DOCUMENTS

| CN | 1747440 A | 3/2006 |
|---|---|---|
| CN | 1885827 A | 12/2006 |
| CN | 1996489 A | 7/2007 |
| CN | 101021819 A | 8/2007 |
| CN | 101246460 A | 8/2008 |

OTHER PUBLICATIONS

Rejection Decision issued in corresponding Chinese patent application No. 200810101662.2, dated Nov. 4, 2010, and English translation thereof, total 11 pages.
Reexamination Decision of corresponding Chinese Patent Application No. 200810101662.2, mailed on Jul. 21, 2011, and English translation thereof,21 pages total.
International search report for International patent application No. PCT/CN2009/070690, dated Mar. 9, 2009.
Chinese office action for Chinese patent application No. 200810101662.2, dated Sep. 18, 2009.
Chinese office action for Chinese patent application No. 200810101662.2, dated Jun. 7, 2010.
Search Report issued in corresponding PCT application No. PCT/CN2009/070690 , dated Jun. 18,2009; total 4 pages.

* cited by examiner

*Primary Examiner* — Shawn X Gu
(74) *Attorney, Agent, or Firm* — Huawei Technologies Co., Ltd.

(57) ABSTRACT

A system and a method for writing cache data and a system and a method for reading cache data are disclosed. The system for writing the cache data includes: an on-chip memory device, configured to cache received write requests and write data associated with the write requests and sort the write requests; a request judging device, configured to extract the sorted write requests and the write data associated with the write requests according to write time sequence restriction information of an off-chip memory device; and an off-chip memory device controller, configured to write the write data extracted by the request judging device in the off-chip memory device.

17 Claims, 4 Drawing Sheets

SYSTEM AND METHOD FOR WRITING CACHE DATA AND SYSTEM AND METHOD FOR READING CACHE DATA

CROSS-REFERENCE TO RELATED APPLICATIONS

This application is a continuation of International Application No. PCT/CN2009/070690, filed on Mar. 9, 2009, which claims priority to Chinese Patent Application No. 200810101662.2, filed on Mar. 10, 2008. Both of the applications are hereby incorporated by reference in their entireties.

FIELD OF THE INVENTION

The present invention relates to computer communication technologies, and in particular, to a system and a method for writing cache data and a system and a method for reading cache data.

BACKGROUND

Packet caching is one of the necessary key technologies in modern communication devices. The main purpose of the packet caching is to cache data packets in the event of data traffic congestion, so as to avoid or reduce data loss. With the continuous increase of the communication device speed, packet caching becomes harder and harder, and the main difficulty is in the combination of a large capacity and a high speed.

A basic requirement on high-end routers and other communication devices is to have a packet cache capable of absorbing wire-speed traffic of at least 200 ms. This means in the case of 100 Gbps port speed, the devices need be able to cache at least 20 GB of data. The packet cache also needs to provide a read and write bandwidth that matches the port speed. The port speed of up to 100 Gbps makes it rather difficult for a low-cost, large-capacity Dynamic Random-Access Memory (DRAM) to serve as the packet cache.

For communication devices not requiring such a high caching capacity, like a Layer 2 switch, using an on-chip cache is a simple and low-cost method, where data packets are cached directly in memories inside a chip so as to avoid the extra cost for the use of off-chip memories. With the method, no off-chip memory device controller or connecting pins are needed, so that the complexity and cost of chip design are lower. Moreover, the on-chip cache also provides sufficient read and write bandwidth for such communication devices.

Another method to increase packet caching capacity while providing the required read and write bandwidth is to use off-chip memories. High-speed Static Random-Access Memory (SRAM) or dedicated memories such as Reduced Latency Dynamic Random Access Memory (RLDRAM) are often adopted.

The universal DRAM is cheap and widely used. It has over 1 GB of capacity per chip. The DRAM can provide a large packet cache capacity at a low-cost and with low risks.

During the implementation of the present invention, however, the inventor found that none of the above-described on-chip high-speed caching method, off-chip high-speed caching method and off-chip large-capacity caching method can realize large-capacity, high-speed and low-cost packet caching at the same time. For example, the on-chip caching method normally provides lower than 10 MB of cache capacity, which is not suitable for high-end routers and Layer 3 switches that require high caching capacities. SRAM is expensive and the capacity per chip is limited to below 72 MB. Dedicated memories are also expensive and subject to supply risks. The universal DRAM has a low read and write efficiency so that the effective bandwidth is restricted and hard to meet the wire speed storage requirement of the high-end communication devices.

SUMMARY OF THE INVENTION

Embodiments of the present invention provide a system and a method for writing cache data and a system and a method for reading cache data to realize a large-capacity, high-speed packet caching.

According to the embodiments of the invention, a system for writing cache data includes:

an on-chip memory device, configured to cache one or more received write requests and write data associated with the write requests, and to sort the received write requests;

a request judging device, configured to extract the sorted write requests and the write data associated with the write requests according to write time sequence restriction information of an off-chip memory device; and an off-chip memory device controller, configured to write the write data extracted by the request judging device into the off-chip memory device.

In the above system, a combination of the on-chip and off-chip memory devices provides a large-capacity data storage space and a high-speed data read/write efficiency.

According to the embodiments of the invention, a system for reading cache data includes:

an on-chip memory device, including a first module, the first module is configured to cache one or more received read requests and to sort the received read requests;

a request judging device, configured to extract the sorted read requests according to read time sequence restriction information and send the read requests; and an off-chip memory device controller, configured to read data from an off-chip memory device according to the received read requests.

The on-chip memory device further includes a second module, configured to cache the read data associated with the read requests and sort and send the read data.

In the above system, a combination of the on-chip and off-chip memory devices provides a large-capacity data storage space and a high-speed data read/write efficiency.

According to embodiments of the invention, a method for writing cache data includes:

receiving one or more write requests and write data associated with the write requests;

caching the write data associated with the received write requests;

caching and sorting the write requests; extracting the sorted write requests and the write data associated with the write requests according to write time sequence restriction information of an off-chip memory device; and writing the extracted write data into the off-chip memory device.

The above method helps to provide a large-capacity data storage space and a high-speed data read-write efficiency.

According to embodiments of the invention, a method for reading cache data includes:

caching and sorting received read requests;

extracting the sorted read requests according to read time sequence restriction information of an off-chip memory device;

reading data from the off-chip memory device according to the extracted sorted read requests;

caching the read data associated with the extracted sorted read requests and sorting the read data according to the association between the read data and the read requests; and sending the sorted read data to a read requestor associated with the read requests.

The above method helps to provide a large-capacity data storage space and a high-speed data read-write efficiency.

The following describes the present invention in detail with reference to the accompanying drawings and embodiments.

BRIEF DESCRIPTION OF THE DRAWINGS

For a better description of embodiments of the present invention or technical solutions in the prior art, the following briefly describes the required drawings. It is apparent that these drawings are some embodiments of the present invention only, and those skilled in the art may obtain other drawings based on these drawings without creative work.

DETAILED DESCRIPTION OF THE EMBODIMENTS

Figure 1:
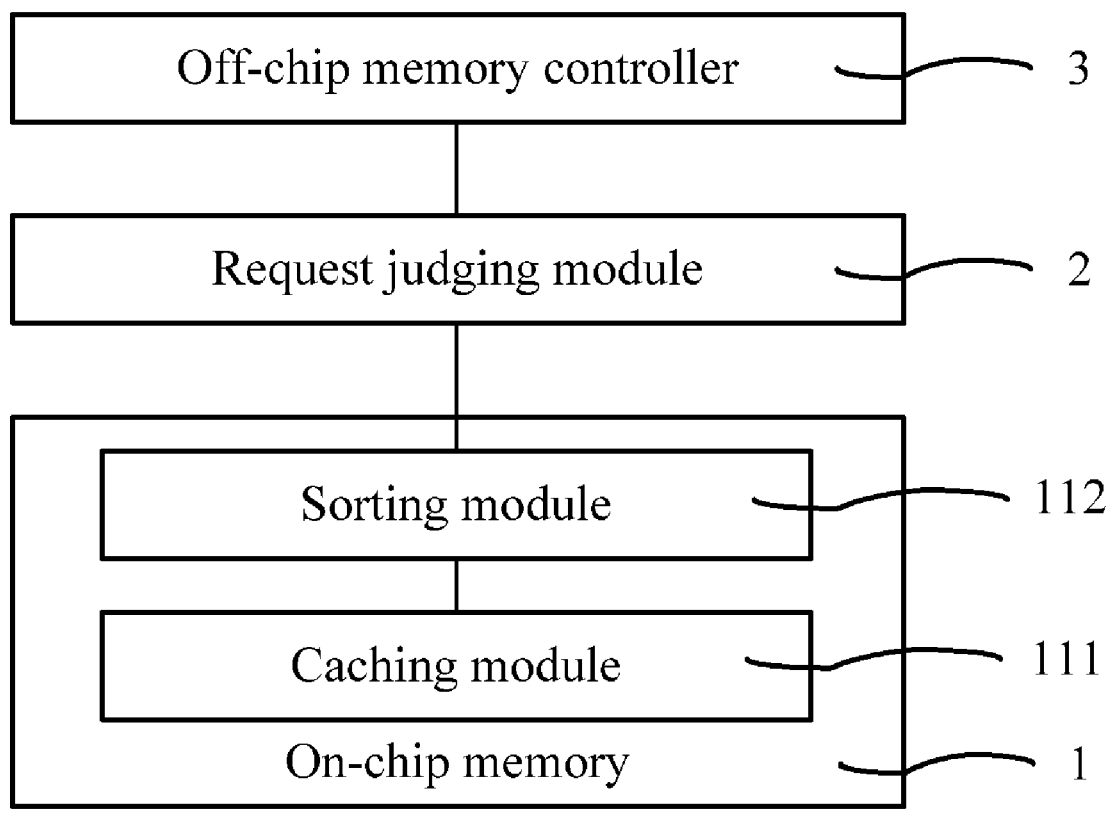
FIG. 1 shows a structure of a system for writing cache data according to an embodiment of the present invention.

FIG. 1 shows a structure of a system for writing cache data according to an embodiment of the present invention. The system includes: an on-chip memory device 1, configured to cache one or more received write requests and write data associated with the received write requests, and to sort the write requests; a request judging device 2, configured to extract the sorted write requests and the write data associated with the write requests according to write sequence restriction information of an off-chip memory device; and an off-chip memory device controller 3, configured to write the write data extracted by the request judging device 2 into the off-chip memory device.

The on-chip memory device includes: a caching module 111, configured to cache the received write requests and the data associated with the write requests. To increase the write efficiency of the off-chip memory device, the received write requests need to be sorted and therefore the on-chip memory device further includes: a plurality of write queues, configured to store write requests, wherein the number of write queues equals to the number of banks of the off-chip memory device; and a sorting module 112, configured to put those write requests whose associated writing data are to be written in the same bank of the off-chip memory device in a same write queue.

The sorting module 112 further includes: a plurality of in-queue counters, each corresponding to a write queue, configured to count the number of write requests entering each write queue; and a plurality of out-queue counters, each corresponding to a write queue, configured to count the number of write requests leaving each queue. The in-queue counters and out-queue counters are provided for the purpose of guaranteeing ordered extraction of the write requests and read requests. A read request will not leave an associated read request queue until all write requests for writing to the same bank of the off-chip memory device are out of the write request queue.

In addition, when the cached data amount is small, the data may be stored in the on-chip memory device directly without being written into the off-chip memory device. The off-chip memory device may be a Dynamic Random Access Memory (DRAM), a Synchronous Static Random Access Memory (SSRAM), or a Reduced Latency Dynamic Random Access Memory (RLDRAM). For the purpose of reducing the cost, the off-chip memory device may also be r a universal DRAM.

In the above-described system, the caching module 111 caches write requests and the write data associated with the write requests, and the sorting module 112 sorts the write requests. The sorted write requests and the associated write data are extracted according to the time sequence restriction information of an off-chip memory device and sent to an off-chip memory device controller. Then, the write data is stored in the off-chip memory device. Thus, the writing of the cached data is completed.

In the above-described system, an on-chip memory device is used in combination with an off-chip memory controller, so that the read and write efficiency of the off-chip memory device is effectively improved to provide the large-capacity data storage space and high-speed read and write efficiency required by high-end communication devices.

Figure 2:
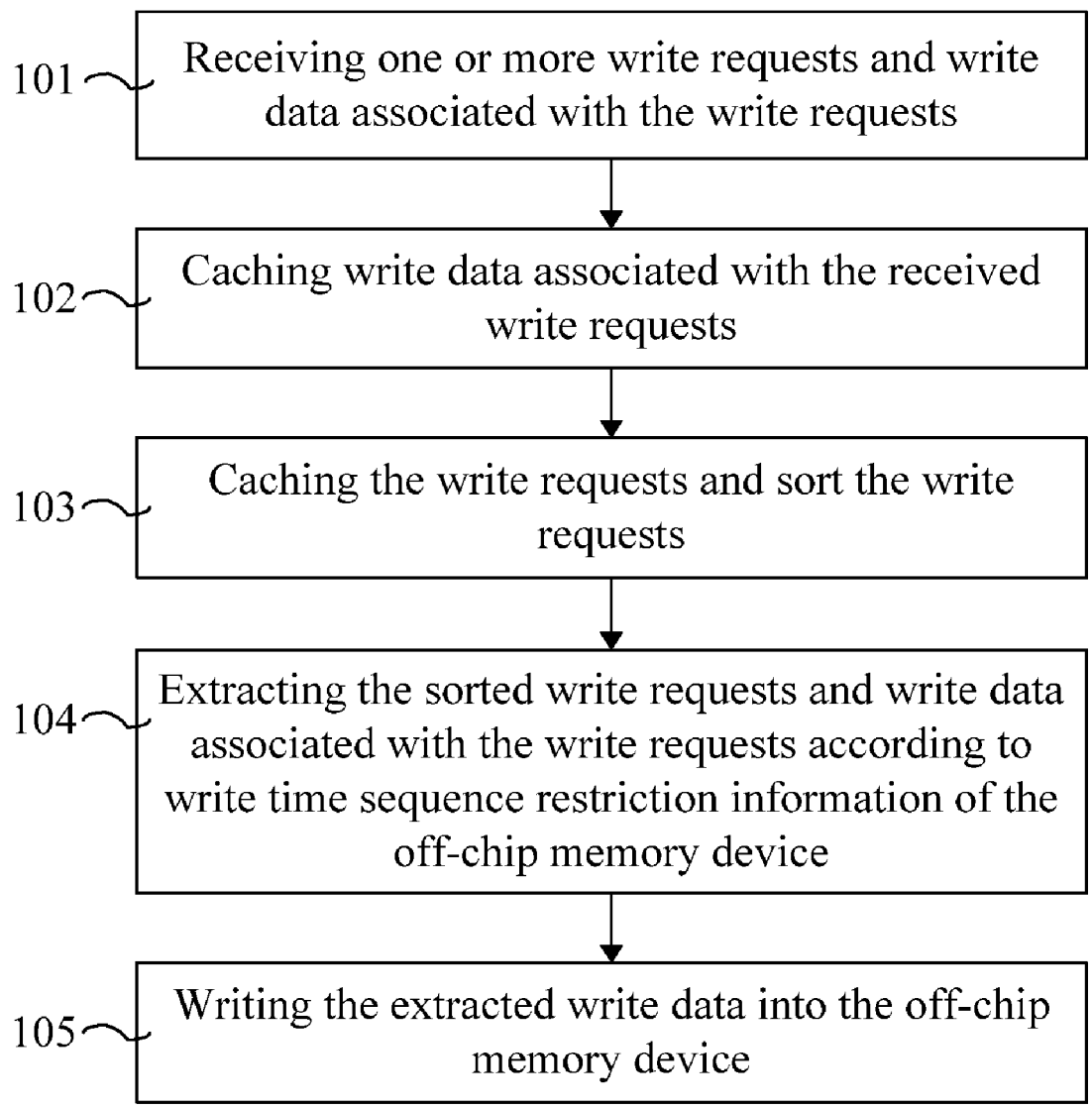
FIG. 2 shows a flowchart of a method for writing cache data according to an embodiment of the present invention.

FIG. 2 shows a flowchart of a method for writing cache data according to an embodiment of the present invention. The method includes the following steps:

Step 101: Receiving one or more write requests and write data associated with the write requests;

Step 102: Caching write data associated with the received write requests;

Step 103: Caching the write requests and sorting the write requests.

The sorting of the write requests includes: storing the write requests in a plurality of write queues, the number of which equals to the number of banks of an off-chip memory device; and putting write requests for writing data in one bank of the off-chip memory device in a same write queue. With the sorting step, write requests are quickly put in multiple queues. In the step, the number of write requests entering each queue and the number of write requests leaving the queue are counted and sent. The counting operation is performed to guarantee the sequence of write requests and read requests because a read request should not leave an associated read request queue before all the write requests for writing to a same bank of the off-chip memory device have left the write request queue.

In addition, before caching the write requests and sorting the write requests, the method further includes: determining that the address of the write data associated with the write requests is outside a first predetermined address range.

The first predetermined address may be set as needed. The purpose of caching the data is to facilitate the subsequent read operations.

Step 104: Extracting the sorted write requests and the write data associated with the write requests according to the write time sequence restriction information of the off-chip memory device.

The time sequence restriction information of the off-chip memory device may be time sequence restriction information of a DRAM.

Step 105: Writing the extracted data into the off-chip memory device.

Thus, the extracted data is written into the off-chip memory device and the writing of the cache data is completed.

In the above method, the write requests are sorted so that the speed of data writing is greatly increased and thereby, a large-capacity data storage space and a high read and write efficiency are realized.

Figure 3:
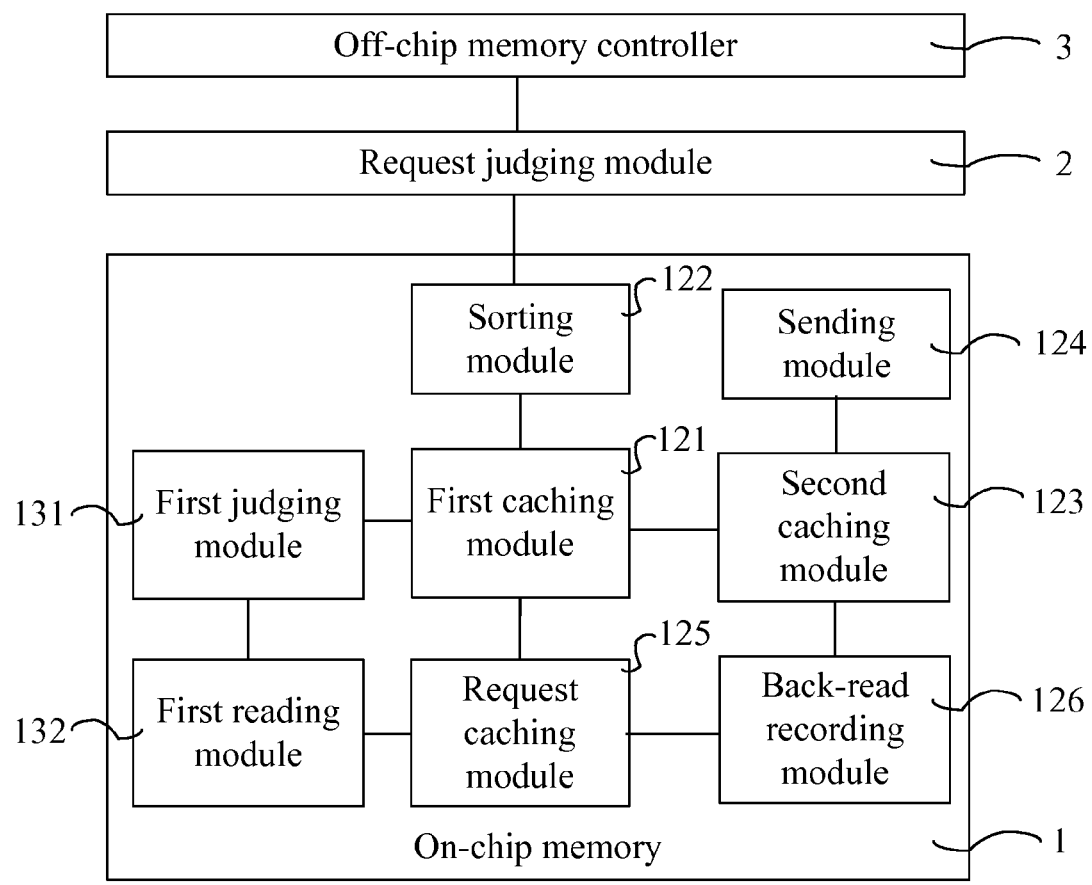
FIG. 3 shows a structure of a system for reading cache data according to an embodiment of the present invention.

FIG. 3 shows a structure of a system for reading cache data according to an embodiment of the present invention. The system includes: an on-chip memory device 1, a request judging device 2, and an off-chip memory device controller 3. The on-chip memory device 1 includes a first module, configured to: cache one or more received read requests and the read data associated with the read requests, sort the read requests and the read data, and send the sorted read data. The request judging device 2 is configured to extract the sorted read requests according to read time sequence restriction information and send the sorted read requests. The off-chip memory device controller 3 is configured to read data from an off-chip memory device according to the received read requests. The on-chip memory device 1 further includes a second module, configured to cache the read data associated with the read requests, and sort and send the read data.

The first module includes: a first caching module 121, configured to cache the received read requests. To increase the read efficiency of the off-chip memory device, it is needed to sort the read requests. Therefore, the first module further includes: a plurality of read queues, configured to store read requests, wherein the number of the read queues equals to the number of banks of the off-chip memory device; and a sorting module 122, configured to put read requests for reading data from a same bank of the off-chip memory device into a same read queue sequentially. The second module includes a second caching module 123, configured to cache the read data associated with the received read requests; and a sending module 124, configured to send the data associated with the read requests according to the sequence of the read requests.

The sorting operation increases the read efficiency of the off-chip memory device but also disturbs the original order of read requests. Therefore, when data is read back to the on-chip memory device, the data needs to be sorted again. Therefore, the on-chip memory device also includes: a request caching module 125, configured to store the read requests according to sequence of the received read requests; and a back-read recording module 126, configured to record the address of the on-chip memory device allocated to each read request stored in the request caching module 125 to cache the data read back from the off-chip memory device. The second caching module 123 includes a data caching module, configured to cache the data read back from the off-chip memory device in the address recorded by the back-read recording module 126. The sending module 124 includes a sequential sending module, configured to send the data stored in the data caching module to a read requestor according the association between the read requests stored in the request caching module and the address of the on-chip memory device recorded by the back-read recording module for the data read back from the off-chip memory device.

The off-chip memory device may be a DRAM, an SSRAN, or an RLDRAM, or, for the purpose of reducing the cost, may be a universal DRAM.

The sorting module further includes: a plurality of read request counters, each matching a read queue. A read request counter is configured to record a value of an in-queue counter of a write queue in the same bank of the off-chip memory device as a read queue when the read requests enter the read queue. The request judging device should guarantee the order of the read and write requests when extracting the sorted read requests according to the read time sequence restriction information. Therefore, the request judging device further includes a judging module, configured to: receive the value of an out-queue counter and value of the read requests counter, and when the value of the read requests counter is not larger than the value of the out-queue counter, to extract read requests in the read queue and send the read requests. This means a read requests will not leave the read queue until all write requests for writing into the same bank of the off-chip memory device have left the write queue.

In addition, when the read data is in the on-chip memory device, the data may be obtained directly from the on-chip memory device. Therefore, the on-chip memory device further includes: a first judging module 131, configured to judge whether the data associated with the read requests is within the first predetermined address range; a first reading module 132, configured to send the read requests to the request caching module 125 when the data associated with the read requests is within the first predetermined address range, and read the data from the data caching module. This operation reduces or avoids the process of writing the data into an off-chip DRAM and reading it back to the on-chip memory device, thus further increasing the effective bandwidth of the packet cache of the communication devices.

In addition, when write data is written from the on-chip memory device to the off-chip memory device, if the address of the data stored by the on-chip memory device has not been used to write new data, the data may be read directly from the on-chip memory device. Therefore, the on-chip memory device further includes: a second judging module, configured to judge whether new data is written in the address of the read data in the caching module when the read data associated with the read requests is within a second predetermined address range; and a second reading module, configured to send the read requests to the request caching module when no new data is written in the address of the read data in the caching module and read the data from the caching module. Therefore, the first judging module 131 in FIG. 3 may be replaced by the second judging module and the first reading module 132 may be replaced by the second reading module.

In the above system, the caching module caches received read requests and read data associated with the read requests; the sorting module sorts the read requests; then the request judging device extracts the sorted read requests according to the read time sequence restriction information and sends the read requests; the off-chip memory device controller reads data from the off-chip memory device to the on-chip memory device according to the received read requests; then the request caching module, back-read recording module and data caching module sort and send the read data. Thus, the reading of data is completed.

The time sequence restriction information is the time sequence restriction information of the off-chip memory device and varies with the off-chip memory devices. Table 1 gives an example of a time sequence requirement for reading and writing in the case of a DDR2 DRAM.

TABLE 1

| Command | Time | Time @ 266 Mh | Time @ 400 Mh |
|---|---|---|---|
| Time interval for activating a bank and performing a read/write operation | tRCD | 15 ns/4 clks | 15 ns/6 clks |
| Time interval for activating one bank | tRC | 55 ns/15 clks | 55 ns/22 clks |
| Time interval between activating two different | tRRD | 10 ns/3 clks | 10 ns/4 clks |

TABLE 1-continued

| Command | Time | Time @ 266 Mh | Time @ 400 Mh |
|---|---|---|---|
| banks | | | |
| Time interval between read operations | tCCD = BL/2 | 4 clks | 4 clks |
| Time interval from a read operation to a write operation | (BL/2) + 2 | 6 clks | 6 clks |
| Time interval from a write operation to a read operation | (CL − 1) + (BL/2) + tWTR | 9 clks | 12 clks |

To meet the above time sequence requirement, the request judging device may read read/write requests from read request queues and write request queues in the following mode, where "bank" is the cache bank in the off-chip memory device associated with the read request queues and write request queues.

Supposing A(n), R(n), and W(n) represent the commands to activate bank n, read bank n and write bank n, respectively, the following three command groups are defined.

Read command group: R(n, m)=[A(n) R(m) Nop Nop Nop R(m) Nop Nop];

Write command group: W(n,m)=[A(n) W(m) Nop Nop Nop W(m) Nop Nop];

Null command group: N(k)=[k Nop commands].

For an 8-bank DDR2 DRAM, the request judging device may extract read and write requests at fixed intervals described in Table 2.

TABLE 2

| R(0,7) | R(1,0) | R(2,1) | R(3,2) | R(4,3) | R(5,4) | R(6,5) | R(7,6) | N(9) |
|---|---|---|---|---|---|---|---|---|
| W(0,7) | W(1,0) | W(2,1) | W(3,2) | W(4,3) | W(5,4) | W(6,5) | W(7,6) | N(12) |

If there are no valid requests in the read request queue or write requests queue of a bank, the associated read or write operations are changed to the null command group N(8).

With the above method, if each read request queue and write requests queue has valid requests, the DRAM read and write efficiency will be up to 128/149=86%.

In the system, a combination of an on-chip memory device and an off-chip memory device is used, so that the read and write efficiency of the off-chip memory device is effectively improved to provide the large-capacity data storage space and high-speed read and write efficiency required by the high-end communication devices and flexible packet cache solutions for the low-end and medium-range devices.

Figure 4:
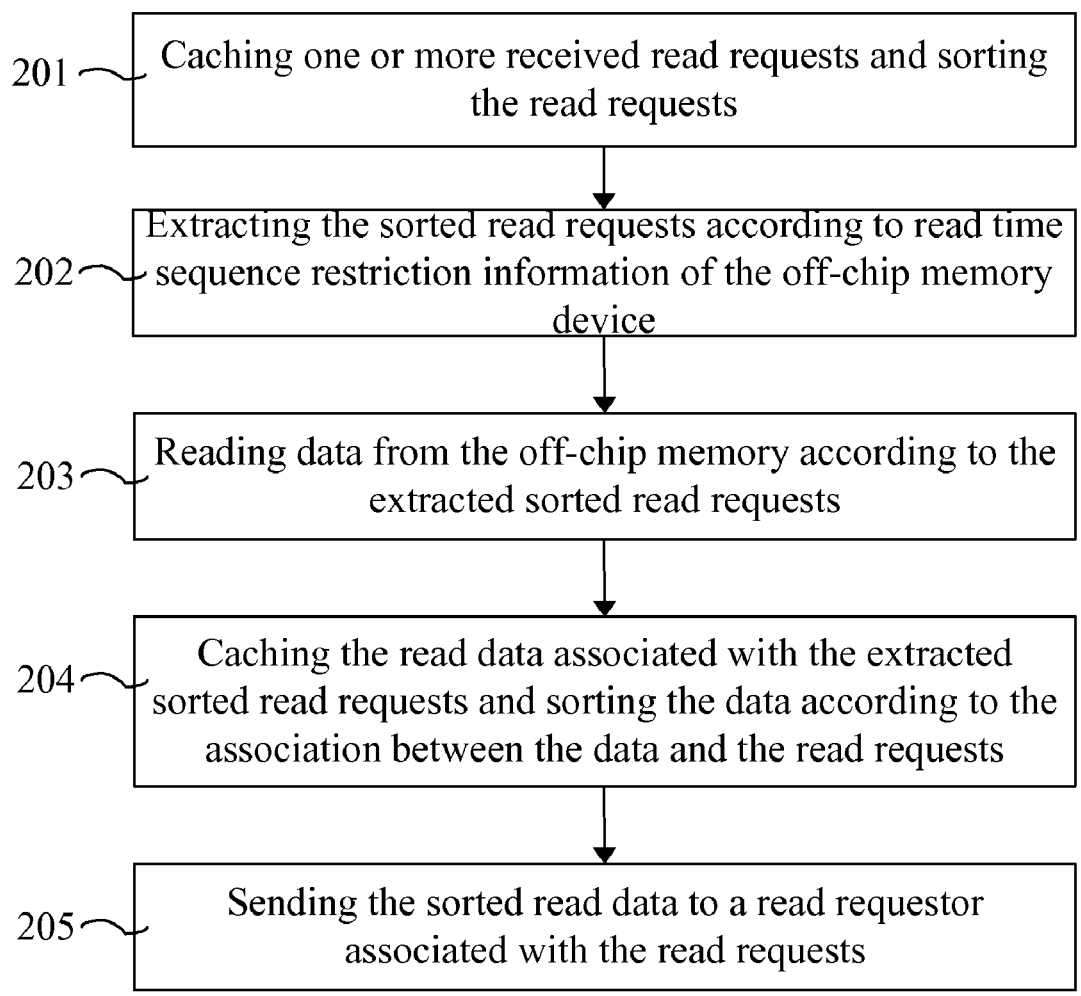
FIG. 4 shows a flowchart of a method for reading cache data according to an embodiment of the present invention.

FIG. 4 shows a flowchart of a method for reading cache data in an embodiment of the present invention. The method includes the following steps:

Step 201: Caching one or more received read requests and sorting the read requests.

The sorting step includes: storing read requests into a plurality of read queues, wherein the number of read queues equals to the number of banks in an off-chip memory device; and putting the read requests for reading data from a same bank in the off-chip memory device into one read queue in turn. The sorting step also includes counting the number of read requests entering each queue and sending the number.

Step 202: Extracting the sorted read requests according to read time sequence restriction information of the off-chip memory device.

In the step, when the read requests are extracted from a certain queue, the number of write requests leaving a write queue and the number of read requests entering a read queue are received; and when the number of the read requests entering the read queue are not larger than the number of write requests leaving the write queue, the read requests are extracted from the read queue.

Step 203: Reading data from the off-chip memory device according to the extracted sorted read requests.

Step 204: Caching the data associated with the extracted sorted read requests and sorting the data according to the association between the data and the read requests.

The step includes: storing the read requests according to the sequence of reception, recording a cache address allocated for the read requests to cache the read data, and caching the data read from the off-chip memory in the cache address allocated for the read requests.

Step 205: Sending the sorted read data to a read requestor associated with the read requests.

When valid data is cached in the cache address, the valid data is sent to the associated read requestor.

In addition, before the sorting of the read requests in step 201, the method further includes: determining whether the data associated with the read requests is within a first predetermined address range; if the data associated with the read requests is within the first predetermined address range, reading the data from the data cached in the first predetermined address range according to the sequence of received read requests; and if the data associated with the read requests is outside the first predetermined address range, sorting the read requests.

Before the sorting of the read requests in step 201, the method further includes: checking whether the data associated with the read requests is within a second predetermined address range; if the data associated with the read requests is within the second predetermined address range, checking whether new data is written in the address to store read data and if no new data is written in the address, reading data from data cached in the second predetermined address range according to the sequence of received read requests; otherwise, sorting the read requests.

With the above method, the read and write efficiency of the off-chip memory device is effectively improved to provide the large-capacity data storage space and high-speed read and write efficiency required by the high-end communication devices and flexible packet cache solutions for the low-end and medium-range devices.

Those skilled in the art may understand that all or part of the steps in the preceding embodiments may be performed by hardware instructed by a program. The program may be stored in a computer readable storage medium such as a read-only memory/random access memory (ROM/RAM), a magnetic disk or a compact disk.

Lastly, it is to be known that although the invention has been described through some exemplary embodiments, the invention is not limited to such embodiments. It is apparent that those skilled in the art can make various modifications and variations to the invention without departing from the spirit and scope of the present invention. The invention is intended to cover the modifications and variations provided that they fall in the scope of protection defined by the following claims or their equivalents.

What is claimed is:

1. A system for writing cache data, comprising:
   an on-chip memory device, configured to cache received write requests and write data associated with the received write requests, and sort the received write requests;
   a request judging device, configured to extract the sorted write requests and the write data associated with the sorted write requests according to write time sequence restriction information of an off-chip memory device; and
   an off-chip memory device controller, configured to write the write data extracted by the request judging device into the off-chip memory device,
   wherein the on-chip memory device comprises:
   a caching module, configured to cache the write data associated with the write requests;
   a plurality of write queues, configured to store the write requests, wherein a number of the write queues equals to a number of banks in the off-chip memory device; and
   a sorting module, configured to put the write requests for writing data in one bank of the off-chip memory device in one write queue.

2. The system of claim 1, wherein the on-chip memory device further comprises:
   a plurality of in-queue counters, each corresponding to a write queue, configured to count a number of write requests entering the write queue; and
   a plurality of out-queue counters, each corresponding to a write queue, configured to count a number of write requests leaving the write queue.

3. The system of claim 1, wherein the off-chip memory device comprises a Dynamic Random Access Memory (DRAM), a Synchronous Static Random Access Memory (SSRAM) or a Reduced Latency Dynamic Random Access Memory (RLDRAM).

4. A system for reading cache data, comprising:
   an on-chip memory device, comprising a first module, said first module being configured to cache read requests and sort the read requests;
   a request judging device, configured to extract the sorted read requests according to read time sequence restriction information and send the sorted read requests; and
   an off-chip memory device controller, configured to read data from an off-chip memory device according to the sorted read requests sent by the request judging device;
   wherein the on-chip memory device further comprises a second module, said second module being configured to cache read data associated with the read requests, sort and send the cached read data,
   wherein the first module comprises:
   a first caching module, configured to cache the read requests;
   a plurality of read queues, configured to store the read requests, wherein a number of read queues equals to a number of banks in the off-chip memory device; and
   a sorting module, configured to put the read requests for reading data from one bank of the off-chip memory device into one read queue;
   and wherein the second module comprises:
   a second caching module, configured to cache the read data associated with the read requests; and
   a sending module, configured to send the read data associated with the read requests according to a sequence of the read requests.

5. The system of claim 4, wherein the on-chip memory device further comprises:
   a request caching module, configured to store the read requests according to the sequence of the read requests;
   a back-read recording module, configured to record an address of the on-chip memory device allocated to each read request stored in the request caching module to cache data read back from the off-chip memory device; and
   the second caching module, comprising a data caching module, said data caching module being configured to cache the data read back from the off-chip memory device in the address recorded by the back-read recording module;
   and wherein the sending module comprises a sequential sending module, said sequential sending module being configured to send data cached in the data caching module to a read requestor according to an association between the read requests stored in the request caching module and the address of the on-chip memory device recorded by the back-read recording module for data read back from the off-chip memory device.

6. The system of claim 5, wherein the on-chip memory device further comprises:
   a first judging module, configured to check whether the read data associated with the read requests is within a first predetermined address range; and
   a first reading module, configured to send the read requests to the request caching module and read data from the data caching module when the data associated with the read requests is within the first predetermined address range.

7. The system of claim 5, wherein the on-chip memory device further comprises:
   a second judging module, configured to check whether new data is written in an address of the read data in the second caching module when the data associated with the read requests is within a second predetermined address range; and
   a second reading module, configured to send the read requests to the request caching module and read data from the second caching module when no new data is written in the address of the read data in the second caching module.

8. The system of claim 4, wherein the off-chip memory device comprises a Dynamic Random Access Memory (DRAM), a Synchronous Static Random Access Memory (SSRAM) or a Reduced Latency Dynamic Random Access Memory (RLDRAM).

9. The system of claim 4, wherein the sorting module comprises:
   a plurality of read request counters, each matching a read queue, configured to record a value of an in-queue counter of a write queue in a same bank of the off-chip memory device as a read queue when a read request enters a read queue;
   and wherein the request judging device comprises:
   a judging module, configured to receive a value of an out-queue counter and value of a read request counter and extract read requests from a read queue when a value of a read request counter is not larger than the value of the out-queue counter.

10. A method for writing cache data, comprising:
    receiving write requests and write data associated with the write requests;
    caching the write data associated with the write requests;
    caching and sorting the write requests;

extracting the sorted write requests and the write data associated with the sorted write requests according to write time sequence restriction information of an off-chip memory device; and writing the extracted write data into the off-chip memory device, wherein the step of sorting of the write requests comprises:

putting the write requests in a plurality of write queues, wherein a number of write queues equals to a number of banks in the off-chip memory device; and putting the write requests for writing data in one bank of the off-chip memory device in one write queue in turn.

11. The method of claim 10, wherein the step of sorting of the write requests further comprises:

counting a number of write requests entering one queue; and counting a number of write requests leaving the same queue.

12. The method of claim 10, wherein before caching and sorting the write requests, the method further comprises:

determining that the write data associated with the write requests is outside a first predetermined address range.

13. A method for reading cache data, comprising:

caching and sorting read requests;

extracting the sorted read requests according to read time sequence restriction information of an off-chip memory device;

reading data from the off-chip memory device according to the extracted sorted read requests;

caching the data associated with the extracted sorted read requests and sorting the data according to an association between the data and the read requests; and sending the sorted data to a read requestor associated with the read requests, wherein the step of sorting of the read requests comprises:

putting the read requests in a plurality of read queues, wherein a number of read queues equals to a number of banks in the off-chip memory device; and putting read requests for reading data from one bank of the off-chip memory device in one read queue.

14. The method of claim 13, wherein the sorting of the data according to the association between the data and the read requests comprises:

storing the read requests according to a sequence of received read requests;

recording a cache address allocated for each received read request stored in the sequence of received read requests to cache the read data; and caching data read from the off-chip memory device in a cache address associated with the read requests;

and wherein the sending of the sorted read data to the read requestor comprises:

when valid data is cached in the cache address, sending the valid data to a read requestor associated with the read requests.

15. The method of claim 13, wherein the sorting of the read requests further comprises:

counting a number of read requests entering a first read queue;

and wherein the extracting of the sorted read requests comprises:

extracting the read requests from the first read queue when the number of the read requests in the first read queue is not larger than a number of write requests leaving a first write queue, wherein the first read queue and the first write queue are associated with a same bank in the off-chip memory device.

16. The method of claim 13, wherein before sorting the read requests, the method further comprises:

judging whether the data associated with the read requests is within a first predetermined address range; if the data associated with the read requests is within the first predetermined address range, reading data from data cached in the first predetermined address range according to a sequence of received read requests; if the data associated with the read requests is outside the first predetermined address range, sorting the read requests.

17. The method of claim 13, wherein before sorting the read requests, the method further comprises:

judging whether the data associated with the read requests is within a second predetermined address range; if the data associated with the read requests is within the second predetermined address range, checking whether new data is written in an address to store the read data, and, if no new data is written in the address, reading data from data cached in the second predetermined address range according to a sequence of received read requests; otherwise, sorting the read requests.

* * * * *